United States Patent [19]

Ferrigno

[11] 4,420,341

[45] Dec. 13, 1983

[54] STABILIZED SURFACE MODIFIED FILLERS

[76] Inventor: Thomas H. Ferrigno, 29 Clover Hill Cir., Trenton, N.J. 08638

[21] Appl. No.: 365,673

[22] Filed: Apr. 5, 1982

[51] Int. Cl.$^3$ .............................................. C09C 1/42
[52] U.S. Cl. ............................ 106/308 Q; 106/308 F
[58] Field of Search ...................... 106/308 Q, 308 F; 260/398.5

[56] References Cited

U.S. PATENT DOCUMENTS

| | | | |
|---|---|---|---|
| 3,022,185 | 2/1962 | Delfosse | 106/308 Q |
| 3,240,609 | 3/1966 | Zienty | 260/398.5 |
| 3,444,218 | 5/1969 | Tribble et al. | 260/398.5 |
| 3,453,131 | 7/1969 | Fadner | 106/308 F |
| 3,959,321 | 5/1976 | McKenna | 260/398.5 |
| 4,038,434 | 7/1977 | Young | 260/398.5 |
| 4,158,075 | 6/1979 | Tanioka et al. | 106/308 F |
| 4,191,670 | 3/1980 | Strauch et al. | 106/308 F |
| 4,270,955 | 6/1981 | Eshelman | 106/308 F |

*Primary Examiner*—James Poer
*Attorney, Agent, or Firm*—Frederick A. Zoda; John J. Kane

[57] ABSTRACT

Several organic acid reactive comminuted minerals, which are generally used as fillers for plastics, rubber, etc., are treated with unsaturated organic acids, alone or in admixture with saturated acids, antioxidants and, alternatively, liquid agents. The surfied (surface modified) fillers thus obtained have excellent wetting and dispersion in both polar and non-polar media as exemplified by their superior packing fractions. Unsaturated acids, alone or in admixture with saturated acids, do not yield fillers stable to the effects of oxidation, both in preparation and use. It has been discovered that very low concentrations of antioxidants stabilize the surfied filler against oxidation and resulting instability. Liquid agents also have been discovered to add a new dimension to the art by cooperating with the acid surfiers (surface modifiers) to modify the interface between the filler and matrix to a greater extent than by previously available techniques. These surfied fillers are thus valuable adjuncts in formulating plastics and related compositions.

11 Claims, No Drawings

STABILIZED SURFACE MODIFIED FILLERS

BACKGROUND OF THE INVENTION

1. Field of the Invention

The present invention is concerned with the improvement of fillers for use in paints, plastics, rubber, adhesives, mastics, calks and the like by a process called surfation, which is defined as the alteration of a filler surface by physical and chemical means, both of which are used in the practice of this invention.

2. Description of the Prior Art

Fillers reacted with saturated organic acids have been long established for their improved dispersion and therefore improved properties in composites of fillers and polymers. The surfaces of the fillers are changed from highly active inorganic surfaces to those having exposed hydrocarbon chains compatible with polymers of a similar non-polar nature. Unsaturated acids provide wetting and dispersion in both polar and non-polar media, but are readily oxidized by air or otherwise degraded to reduce their stabilities and improved properties.

Prior U.S. patent art reveals many examples of various organic acid treatments of calcite fillers. These patents are: U.S. Pat. Nos. 1,264,092; 1,832,416; 1,832,417; 2,199,710; 2,345,191, and 2,374,741. In addition, certain combination treatments with chlorinated paraffins, rosin, fatty acids and esters have been disclosed in U.S. Pat. No. 2,663,695, the use of oil vapor in U.S. Pat. No. 2,050,193, and sulfur, fatty acids and oils in U.S. Pat. No. 2,199,710. Unsaturated acid salts have been utilized for treating kaolinite in U.S. Pat. No. 3,085,080. Alumina hydrate filler is treated with fatty acids in U.S. Pat. No. 4,283,316.

The prior art does not report that organic acids are reactive with a number of minerals that have basic and amphoteric sites, either completely or partially. Further, a wide range of both mono-and di-basic acids from 3 to 24 carbon atoms provide exceptional improvements and are susceptible to the same degradation both in preparation and use. Neither the equivalence of the lower and higher members of the unsaturated acids not their instabilities has been reported in the prior art. In addition, it has been discovered that a wide range of liquid agents which are non-reactive with the acids under conditions of surfation (surface modification) add considerable dimension to the art.

SUMMARY OF THE INVENTION

Organic acids having 3 to 24 carbon atoms and from 0 to 5 double bonds are reacted, at least partially, with acid-reactive mineral fillers such that the mole ratio of unsaturated to saturated acids is at least 1 to 4, and as much as 100% unsaturated acid. The concentration of acid to filler is a function of surface area predominantly and the proportion of reactive surface. In practice, this is best determined by using a reference filler of known surface area as hereinafter described. Concentrations may vary from as little as 0.1% for 100% minus 10 mesh coarse calcite fillers to as much as 10% on precipitated calcium carbonate fillers of 0.07 $\mu$m average equivalent spherical diameter and 30 $m^2/g$ surface area.

Antioxidant is combined with the acid to prevent product degradation during and after surfation. Concentrations as low as 0.005% to as high as 0.1% on the weight of filler have been found operative.

Various liquid agents may be admixed with the acid and antioxidant to obtain economy, certain wetting effects, aid in dissolving or distributing the other agents on the filler surface and interaction with the matrix in which the surfied filler is dispersed, to name a few. As optional but cooperative agents in the practice of this invention, their function is germane to the surfation process and does not stand alone but requires the presence of both acid and antioxidant. Thus, for ease of use, organic agents are chosen which are liquid from about 15 to 55 degrees C. (59 to 131 degrees F.). These organic agents, being not reactive with either or both the acid and antioxidant under surfation conditions, are present from 0 to 100% based on the weight of the acid.

DETAILED DESCRIPTION OF THE PREFERRED EMBODIMENT

Beginning with the surfation process all aspects of the invention will be described.

In order to obtain at least partial initial reaction of the acid with the mineral it is necessary to use equipment which will tumble, rub, shear or grind the filler to expose its surfaces and to obtain a uniform distribution of the surfier. The degree of reaction will be described later. In the process of grinding minerals for use as fillers, very highly active surfaces are derived which almost immediately cause the particles to agglomerate. In this condition, all surfaces are not available for wetting by or for distributing the liquid surfier. Ideally, the surfier is added with the crushed or otherwise prepared mineral to a grinding mill. Such mills may be pin, hammer, internally classifying, roller, ball, autogenous and others utilized according to the toughness of the mineral. As the mineral is ground, the freshly generated surfaces are then most active and the heat liberated in grinding helps to promote the acid reaction.

For straight through grinding, as is usually done with coarse fillers, the surfier concentration is based on the feed. If the mill product is to be classified to remove fines and return the oversize to the mill, the surfier concentration is adjusted to that required for the whole mill product so that all surfaces will obtain the required dosage at the start. Under steady state conditions, the amount of material added to replenish that removed would receive the same surfier concentration as the fine product. Product temperatures are generally 49 degrees C. (120 degrees F.) or higher and residence times are 15 seconds or longer.

Because of the variety of surfied fillers and the precise surfier concentration required for specific applications, it is more expedient to grind or otherwise produce the filler in the preferred size and then to surfy (surface modify) in a separate batch or continuous operation. High to moderate shear mixers designed for this purpose have heating jackets, sealed closures and inlet and outlet pipes to the mixing chamber for surfier addition and purging with inert gas and for removal and collection of volatiles by means of a condenser when volatile solvents are used. Since water is a product of the acid-filler reaction, the condensate quantity can be used as a measure of completeness.

It is advantageous to promote the acid-filler reaction in the shortest time possible so that exposure to air and heat are minimized. With very fine fillers which contain greater volumes of air as bulk powders, it is advantageous to purge the filler before and during surfation with an inert gas such as nitrogen to prevent or reduce exposure to air before use. Judicious choice of antioxidant and its concentration can prevent surfier deterioration under all circumstances, but when peroxide initiators are used in the composite, it is preferable to use the lowest effective concentration. In all cases of powdered filler surfation, it is preferable to first mix the powder while heating to the lowest temperature suitable for short mixing times and acceptable surfied filler properties and then to add the total surfier at once. This allows the surfier to distribute rapidly and uniformly before reaction begins or solvent, if it is present, to evaporate. Depending on the size of batch or a continuous operation, mixing times as short as 15 seconds have been adequate with high shear mixers. The product is then discharged into a bin or conveying line for storage, shipping or packaging with minimum exposure to air.

It will become apparent to those practicing this art that many industrial operations require similar mixing and blending of liquids, polymer powders or pellets with pigments, fillers, stabilizers, plasticizers, lubricants and other additives for compounding or directly fabricating parts. In such instances, the filler may be surfied using present surfiers either alone before other ingredients are added or in situ and the succeeding mixing or processing steps performed. In all cases, the filler and surfier proportion should be maximized for most beneficial effects.

The acid reactive fillers found to be operative are comprised of the minerals calcite, aragonite, dolomite, smithsonite, amphiboles which include tremolite, anthophyllite and actinolite, brucite, antigorite, talc, chlorite, wollastonite, hydrated aluminas which include gibbsite, diaspore and boehmite and mixtures thereof as defined in "Manual of Mineralogy", 19th edition, Hurlbut and Klein, John Wiley and Sons (1977).

Precipitated calcium carbonates are the reaction products of milk of lime and carbon dioxide in dilute solution and are typically produced with average particle sizes of from about 1 to 0.07 $\mu$m equivalent spherical diameter, surface areas of 5.3 to 26 m2/g, densities of 2.65 to 2.71 and packing fractions of 0.37 to 0.54 from oil absorption data to be described later.

Another synthetic material is fiberized blast furnace slag such as that known as rock wool and, in particular, Processed Mineral Fiber of Jim Walter Resources, Inc. These material are essentially calcium silicates with oxides of magnesium, aluminum and others comprising about 25%. They are very basic and reactive with the present acids. Fiber diameters are in the range of 1 to 10 $\mu$m and lengths average 275 $\mu$m. For certain grades and non-fibrous material, diameters can be substantial. Mineral fillers are generally ground in mills described above for use in synthetic marble casting and asphalt filling in very course sizes of 100% minus 10 mesh, U.S. Standard sieves, or fractionated to obtain products with average particle sizes of less than 1 $\mu$m and surface areas to 17 m$^2$/g for the very fine talcs.

The only criterion for filler selection is that it be substantially comprised of the above mineral species and that impurities do not affect the performance essential to the surfied products as herein described.

Organic straight chain acids having 3 to 24 carbon atoms and zero to 5 double bonds range from propanoic and acrylic (propenoic) to lignoceric and tetracosapolyenoic. Also operative are abietic, pimaric and associated rosin acids having 20 carbon atoms and phenanthrene nuclei, isostearic, licanic, dihydroxystearic, ricinoleic, methacrylic and the two important diacids; maleic and itaconic. Although all are operative for present purposes, maleic and crotonic are preferred as the lower end member and linolenic as the upper end member of the unsaturated acids, and caprylic and stearic as the lower and upper end members of the saturated acids. Mixtures of all of these are operative within the mole ratio of at least one unsaturated to 4 saturated to entirely unsaturated, and all are susceptible to instability.

Water is the primary volatile product of all acid-filler reactions and also carbon dioxide with the carbonates. In all cases, residual bonds in the crystals prevent removal of the salt excepting by strenuous hydrolysis.

Longer chain acids of 12 to 24 carbon atoms are derivatives of vegetable and animal fats refined by filtering, distillation and other processes normally sold as mixtures with their constituents reported. Lower members are derived synthetically or by fermentation and are usually of high purity.

Many technical considerations indicate that it is expedient and more economical to use natural mixtures or to fabricate mixtures of saturated and unsaturated acids. Combinations of acids allow those practicing this art to devise systematic arrangements of molecules on the surfied filler as well as to control the average number of reactive sites per particle. For example, if a mole ratio of one of pure linolenic acid to 4 or propanoic acid is to be used to cover a surface which is adequately covered by one percent of linolenic acid only, then according to their molecular weights of 278 to 74 respectively, a mixture of 0.20 linolenic and 0.213 propanoic acids by weight is required. This assumes that both acids subtend the same surface area per molecule.

The economy achieved by the above is also evident by the fact that 0.25% of pure acrylic acid is required instead of 1% of linolenic acid. These and other variations will be illustrated by the examples which follow. With very coarse fillers such as 100% passing 10 mesh U.S. Standard sieves, as little as 0.3% of a mixed fatty acid of average molecular weight 278 is required for complete surface reaction. When acrylic acid (molecular weight 72) is substituted for the mixed fatty acid, then about 0.1% (0.078%) is required.

It is also with the purview of the present invention to use ammonium salts of the acids where expedient, as with aqueous suspension of the fillers or where it is preferable to apply the acid in a water solution, as with acrylic acid due to its volatility and noxious odor. Under processing conditions the ammonia is very rapidly removed and can be vented or condensed as described above. When such aqueous sols are used, it is also preferable to emulsify or disperse the antioxidant and, where applicable, the liquid agent to obtain uniform deposition of the surfier.

The antioxidant comprises many of those commercially available and includes synergists. Primary types include the classification found in "The Encyclopedia of Chemistry", Clark and Hawley, Editors, Van Nostrand Reinhold (1966) at pp 91–93; ketone-amine condensates, hydroquinones and derivatives, alkylated phenols, phosphite esters, alkylated phenol sulfides, polyvalent metal dialkyldithiocarbamates, alkyldithio-phosphoric acid salts, dialkylalkyl selenides, lecithin and others. As synergists, thiodipropionic acid esters, alkyl and aryl phosphites are effective. Depending on the acids used and the concentration of unsaturates, the liquid agents and their concentrations, many antioxidants are effective. It has been found that antioxidant concentration is predominantly a function of the surface area of the mineral. Since it is distributed with the acid and optional liquid agent on the surface of the filler to provide immediate stabilization during surfation, it is apparent that the antioxidant should be dissolved or very uniformly dispersed.

For coarse fillers having surface areas of less than about 1 m$^2$/g, about 0.005% on the weight of the filler is adequate. As much as 0.1% is required for ultrafine precipitated calcium carbonates having surface areas to 30 m$^2$/g.

A great number of amine antioxidants are reactive with organic acid at room temperature, forming amine salts and as such would form a different class of surfier common to the prior art. The only restriction therefore applied to the antioxidant is that it must not be reactive with the acid to form a compound which would reduce its effectiveness or otherwise interfere with the acid-filler reaction. Of the many examples of the above classification which are operative the following are typical: 2, 6-di-tertiary-butyl-para-cresol; 2-6-di-tertiary-butyl-4-metyl-phenol; 4-6-di-tertiary-butyl-phenol; 4-6-di-butyl-tertiary-meta-cresol; 2, 2'-methylene-bis-(4-methyl-5-tertiary-butyl-phenol); hydroxy anisole; 3:1 condensate of 3-methyl-6-tertiary-butyl-phenol with crotonaldehyde; diphenyl-amine and other arylamine condensates with acetone; and many proprietary products and mixtures sold commercially. Synergists may also be used in combination with primary antioxidants which, for present purposes, are used in admixture up to 50 percent of the antioxidant by weight. Examples are: dilauryl-, dimyristyl-, distearyl-, dicetyl-, ditridecyl-, and poly-thiodipropionates; organo-phosphites such as distearyl-pentaerythritol-di-, diphenyl-, di-isooctyl-, tris-nonyl-phenyl-, di-phenyl-iso-decyl-, and other phosphites, many of which are effective stabilizers against discoloration of vinyls, polyamides and other polymers.

Two antioxidants have been found to be preferred for their effective but different properties in composites in which the surfied filler is used. First, 2, 6, -di-tertiary butyl-p-cresol, DBPC, is soluble in the liquid organic acids, almost all of the liquid agents, alcohol and other suitable solvents. Zinc dibutyldithiocarbamate is a fine powder with very limited solubility but very effective nonetheless. It is an accelerator for thermoset elastomers and, after activation, the decomposition product is also an antioxidant. Both are widely used commercially.

The liquid agents comprise a wide range of organic compounds which, for present purposes, are liquid between about 15 to 55 degrees C. (59 to 131 degrees F.) for ease of use in practice. The classes found operable all have boiling points above about 200 degrees C. (392 F.) at atmospheric pressure and vapor pressures of about 1 mm at ambient, but not necessarily, to prevent loss by evaporation during surfation, storage and handling of the surfied filler in processing operations.

The hydrocarbon liquid agents include: petroleum (mineral) oils; petrolatums including mineral jellies, sols of amorphous and crystalline waxes in petroleum oils; cycloparaffins; aromatic oils; cycloolefins; 10 to 18 carbon alpha olefins; low molecular weight polymers of propylene, ethylene and butadiene for example; and various derivatives of petroleum and coal tar. Certain monomers and their derivatives are especially useful and comprise vinyl pyrrolidone, diallylphthalate, diallyl maleate, di- and triallylphosphate, triallyltrimellitate, stearyl acrylate, stearyl methacrylate, pine oil, terpineol and many others.

Many ether, hydroxyl and ester containing liquid agents benefit the surfied filler, especially when it is combined with polar matrices, acting as solvents, wettants and dispersants to assure effective interaction. Suitable are ethylene oxide derivatives of alkyl phenols, phenol, alcohols, polyols, propylene oxide, organic acids and others; hexylene glycol (4-methyl-2, 4-pentanediol), 1, 6-hexanediol, 1, 2, 6-hexane-triol, 2, 4, 7, 9-tetra-methyl-5-decyne-4, 7-diol and its ethylene oxide adducts; glycol ethers and esters such as ethylene glycol monohexyl ether, ethylene glycol monooctyl ether, ethylene glycol dipropionate, ethylene monobenzyl ether, ethylene glycol monobutyl ether laurate, ethylene glycol monomethyl ether ricinoleate, ethylene glycol monophenyl ether, diethylene glycol ethers and esters; 2-ethyl-1, 3-hexanediol; 1, 5-pentanediol; esters of acids and alcohols such as di-2-ethyl-hexyl-phthalate, butyl-benzyl-phthalate, and many others commonly used as plasticizers, polyesters, mono-, di- and tri-glycerides of saturated and unsaturated acids and many others; and certain phosphates such as triphenyl phosphate.

A number of keto compounds are suitable, such as isophorone, 2, 6, 8-trimethyl-4-nonanone, 1-tetralone, 2-pyrrolidone and its N substituted derivatives; 2-hydroxyethyl-, isopropyl-, -cyclohexyl-, -cocoalkyl-, -tallowalkyl-, and -methyl-.

Various pre- or partial polymers or acrylic esters, butadiene and copolymers, unsaturated acids and polyols and the like are similarly useful. Sulfolane is also useful.

All of the above liquid agents are not reactive with the acids under conditions of surfation.

For the present purposes, the liquid agent should be substantially non-reactive below about 120' C. for about 10 minutes, the maximum period of surfation at this temperature, to accommodate longer chain and higher melting acids which may require more nearly complete reaction with the filler for most acceptable properties. Where electrical resistance, for example, is required of the composite, free acid may be detrimental.

It will be further apparent to those practicing this art that longer chain acids, when attached to fillers, can imbibe large volumes of liquid agents whereas certain shorter acids may be somewhat limited in this regard. Thus, one would balance the concentration of liquid agent or mixtures thereof, to only that necessary to achieve the solvent, wetting, bonding, lubricating, stabilizing and plasticizing effects suitable for a particular combination of acid and antioxidant consistant with packing fraction improvement. Also, it is not necessary that all of the reactive filler surface be saturated with acid for the liquid agent to be effective, as will be shown in the examples.

In the preparation of the surfier it is preferred that the acid or acids be applied in a liquid form for rapid and uniform coating and reaction. Antioxidants which dissolve in the acids are preferred although those which are fine powders suspend in the liquids to yield uniform effects. Various solvents for certain of the acids are beneficial for obtaining uniform deposition and ethyl alcohol is most generally useful since it since it is readily removed from the surfied filler and dissipates and oxidizes rapidly in the atmosphere.

If as little as 20% of the acid reacts with the filler within one hour after surfation, completely acceptable products are obtained. Although not wishing to be limited by theory, it is apparent that temporary bonding or chemisorption occurs between the carboxyl and the active filler sites. Most of the molecules are not sufficiently active to redistribute themselves after processing, yet the reaction progresses to the point that the acid is completely reacted from after a few hours to several weeks for the least active long-chain types.

The optional liquids are valuable aids for certain antioxidants and synergists which have very low solubilities in the acids. For example, distearyl pentaerythritol diphosphate does not have adequate solubility in acids and the use of chloroform or benzene, in which it is soluble, is too restrictive. Since as little as 0.002% or less may be required as a synergist on the weight of filler in conjunction with a hindered phenol antioxidant, a 20% solution in triphenyl phosphate allows only 0.008% or less of the liquid agent to be used and the solution can be dispersed in the liquid acid.

There are also numerous examples of liquid agents which are good solvents for the normally crystalline acids such as sorbic, maleic, crotonic and itaconic and thus overcome the need to use volatile solvents and the problems of their removal.

As a basis for acid concentration, extensive experiments with various straight chain acids has indicated that essentially a monolayer and complete hydrophobicity is obtained with a calcite filler having a density of 2.71, and a surface area of 3 $m^2$/g with 1% of an 18 carbon acid. Thus, to compensate for surface area, acid equivalent weight, filler density, and the proportion of reactive surface, the following calculations are guides: 3 $m^2/g \div (1/2.71) = 8.13$ $m^2/cm^3$ for 1 g or 1% stearic acid. A talc having a surface area of 10 $m^2$/g and about 20% of the particle surfaces available for reaction would require: $10 \div (1/2.79) \times 0.2 = 5.58/8.13 = 0.686\%$ stearic acid.

And, if sorbic acid is used in place of stearic acid, assuming that each molecule subtends the same surface area, the ratio of their equivalent weights is $112/284 = 0.39\%$ sorbic acid equals 1% stearic acid. The dibasic maleic acid however is expected to subtend about the same molecular area, so the ratio of the molecular weights would be $116/284 = 0.40\%$ maleic acid equals 1% stearic acid.

These calculations are intended only as guides since particle shape, size, surface smoothness and edge effects can alter the molecular orientation of the acid. Selecting the best acid concentration is thereof somewhat empirical but does not limit the nature and scope of the invention.

The present surfied fillers have versatilities considerably greater than amine and onium compound adducts of the prior art. Acid attachment to the mineral surface provides bond strengths much greater than chemisorption by amines, wetting and dispersing agents. The unsaturation of the acids allows cross-linking with unsaturated polymers or those induced to polymerize through free-radical mechanisms. Thermosetting elastomers, unsaturated polyesters and cross-linked polyethylene are examples. Acid chain length and degree of unsaturation controls the number and character of the polymer-surfied filler interactions. Maleic and acrylic acids provide very rigid links to the filler, whereas 18 carbon or longer unsaturated acids provide flexible links. The former are more suitable for rigid, high modulus composites and the latter for elastomers. Large particles with greater numbers of unsaturated acid molecules attached serve as multiple nuclei for very rigid systems such as polymer concrete, whereas very small particles with fewer molecules attached and controlled unsaturation serve as polymer extenders due to the mobility of small particles in elastomers. These effects can be realized only when the unsaturation is preserved by antioxidants. Unsaturated liquid agents further modify these effects by providing greater numbers of cross-linking sites at the interface or, when the liquid agents are non-reactive, to provide localized plasticizing and therefore greater lubricity and flexibility at the interface.

Unsaturation has been shown to provide greatly improved wetting and dispersion in polar systems of which vinyls and polyamides are examples. With vinyls, typified by poly (vinyl chloride), unsaturates act as hydrogen chloride scavengers to stabilize the polymer to progressive degrading effects of heat and light. Unsaturates are very reactive with amines, so the degradation products of polyamides also can be inhibited from causing progressive deterioration when they are present. Again, these interfaces can be modified by the liquid agents. Polyols inhibit free radicals from degrading the vinyls. Polyamides are plasticized by absorbed water and various hydroxylated liquid agents act in the same manner to stabilize the interface to yield better impact resistance.

An almost limitless variety of modifications can be made to adjust the interface according to the intended use of the surfied filler. Repulsive forced between particles are partially or completely neutralized by judicious selection of acid, antioxidant and liquid agent so that completely non-dusting powders are obtained. Such powders pack more densely for reduced shipping volume and adhere to plastics pellets for ease and uniformity in blending and melt processing. Certain of the liquid agents, such as N-vinyl pyrrolidone, glycol ethers and esters and fluorosurfactants, produce virtually spontaneous dispersion in fluid systems.

The following test methods and designations are common to the examples:

Oil absorption (OA) was determined by ASTM D-281 and the end-point taken when the pressed hemispherical mass just began to exhibit a gloss to assure that all of the voids were filled with liquid. Under these conditions precision was plus or minus 0.2 as weight of liquid per 100 parts by weight of the filler for values of about 10 to 20, somewhat less below and greater above. The oil used for the standard test is raw linseed oil (LO), density 0.93 at 20 degrees C. For greater reliability of the data, one percent 2, 6-di-tertiary-butyl-para-cresol (DBPC) was dissolved in the LO to prevent oxidation. Drakeol 35, a mineral oil of Pennreco (MO) having a density of 0.876 at 20 degrees C. and a Saybolt universal viscosity of 340–365 seconds at 100° F. also was used for OA to compare the effects of the polar LO at 100° F. with the non-polar MO relative to similar polymers and systems. Packing fraction (PF) was calculated from OA values as the fractional filler volume of the total of filler and oil volumes. PF is then the maximum filler volume obtainable in a continuous system wherein the filler particles are wet and dispersed and the voids between them are filled with liquid. This is a fundamental basis for filler comparison as elucidated in "Handbook of Fillers and Reinforcements for Plastics", Katz and Milewski, Editors, Van Nostrand Reinhold (1978), pp 11–58.

Filler density or specific gravity was calculated from that of the filler and the agents used, assuming that the reaction product of the filler and acid is virtually the same as that of the unreacted acid.

Free, unreacted acid was determined by dispersing 50.00 g of surfied filler in 100 ml of denatured alcohol, allowing the mixture to sediment and pipeting 50 ml of the supernatant into a suitable cup. This was then titrated with 0.1 N aqueous sodium hydroxide and 4 drops of 0.1 percent thymol blue in alcohol to a non-fading blue-green end-point. Standards were prepared by titrating about 0.5 g of the acid in 50 ml of alcohol with the sodium hydroxide solution in the same manner to obtain a value of g of acid per ml of 0.1 N sodium hydroxide. Precision was plus or minus 2 percent free acid. When dibasic acid were titrated for non-soluble, one-half reacted acid, the slurry of surfied filler and alcohol was titrated directly with agitation and sedimentation in stepwise fashion to determine the end-point.

The hydrophobicity test (HP) consisted of dusting about 0.5 g of the filler on 50 ml of water in a cup and swirling. A convex meniscus indicated complete non-wetting (100% HP) and the proportion of wetted and sedimented filler subtracted therefrom.

All surfied filler were prepared in the following manner:

From 100 to 400 g of filler, depending upon its bulk density, was preheated in a convection oven for about one hour at 225 degrees F. It was immediately placed in the jar of a Waring Blender, model 11-299, 14 speed and mixed at the lowest, stir, speed for about 10 seconds. The prepared surfier was then added, the jar capped and mixing continued for the time indicated. Immediately thereafter the temperature of the surfied filler was taken and some of the filler was spread on flat plastics dishes to a depth of 0.5 cm and 8 cm in diameter to obtain 10 to 20 g. The remainder was then placed in heavy 4 mil polyethylene bags and sealed.

The flat-dishes were exposed at ambient side by side for each of the companion experiments indicated in the examples. The rationale for exposure to air is based on the approximation that each 10 degrees C. rise in temperature doubles the oxidation rate. As mentioned above, dry-blending, mixing, extruding and similar operations for incorporating fillers into composites exposes the filler to about 150 degrees C. or higher for about 5 minutes on the average. Therefore, taking 20 degrees C. as ambient, $150-20=130$ divided by $10=13$, and twice the reaction rate equals $2^{13} \times 5$ minutes or about 41,000 times the reaction rate at ambient. This approximates an ambient reaction of 7 days $\times$ 24 hours $\times$ 60 minutes equaling 10,080. The oxidation rates are then of the same order and considerably easier to monitor by alteration of OA.

EXAMPLE 1

The filler of this example was ground oyster shells having an average particle size of 3.3 μm e.s.d. (equivalent spherical diameter), 100% finer than 44 μm and a density of 2.71 sold as Laminar by Oyster Shell Products Co. The OA/LO was 19.4 by our test to yield a PF of 0.639. Emersol 315 of Emery Industries, a linseed fatty acid was used and had the following properties: Iodine value 145-160, acid valve 195-201; unsaponifiables of 1% maximum and an acid analysis of 62% linoleic, 7.5% linolenic, 24% oleic, 1% palmitoleic, 0.5% myristoleic, 0.5% stearic, 4% palmitic, 0.5% myristic and traces of other saturated acids. Surfiers were prepared by mixing Drakeol 35 (DR-35) and DBPC as indicated. The DBPC was readily soluble with slight warming, and was a powdered commercial grade CAO-1 of Ashland Chemicals Co., having a density of 1.048, a boiling point of 265° C. and a melting point of 70° C. All surfiers are reported as percent by weight of the filler. All were mixed for 10 minutes and had final temperatures of about 120 degrees F.

The data indicated that with EM-315 concentration slightly greater and less than the control without DBPC, the DBPC effectively stabilized the surfied fillers against changes in OA on exposure. No data was available for surface area, but was believed to be about 3 m²/g. On this basis, about 1% of EM-315 should have been required to provide 100% HP, but it may be seen that the presence of DR-35 reduced the requirement to nearly one-half while demonstrating considerable superiority over the non-surfied filler for OA. No. 4-6 apparently oxidized in preparation as evidenced by its higher initial OA which continued to increase with exposure to cause graininess when the sample was rubbed in the OA test.

EXAMPLE 1

| No. | 4-6 | 3-6 | 4-4 |
| --- | --- | --- | --- |
| % EM-315 | 0.534 | 0.67 | 0.52 |
| % DR-35 | 0.266 | 0.33 | 0.26 |
| % DBPC | 0 | 0.02 | 0.021 |
| OA/LO, initial | 16.2 | 15.4 | 15.2 |
| OA/LO, exposed 7 days | 17.6 | 15.2 | 15.4 |
| % HP, initial | 100 | 100 | 100 |
| PF, initial | 0.682 | 0.694 | 0.695 |
| PF, exposed 7 days | 0.663 | 0.697 | 0.693 |
| Density | 2.68 | 2.66 | 2.68 |

EXAMPLE 2

A dry ground calcite of 95+% purity, having an average particle size of 3.3 μm, 100% finer than 25 μm, a surface area of 3.0 m²/g, an OA/LO of 13, 6, PF=0.716, and 2.71 density was used as above. N-vinyl-2-pyrrolidone, (VP), was used as the liquid agent and the EM-315 and DBPC were the same as in Example 1.

The data indicates that the surfier of 58-2 distributed more rapidly and uniformly than EM-315 only of 58-1 since less time was required to produce fluidizing during mixing. Despite the shorter mixing time, 58-2 tended to be more completely reacted after three days age. No. 58-1 had a higher OA/LO at three days in the sealed bag compared with stabilized 58-2. On exposure 58-2 was lower at 4 days but increased to within the plus or minus 0.2 precision of the test at 7 days exposure. This would indicate a variable instability which would depend on its exposure in processing a composite. No. 58-2 had the same OA/LO in each comparative case indicating exceptional stability and PF values. VP is an excellent wettant and dispersant, and very effective at low concentrations. Another difference of great importance was the results of the HP test. No. 58-1 after having been exposed and bagged for 7 days filmed on the water but the film broke and sedimented after 15 minutes. No. 58-2 remained completely and indefinitely hydrophobic under the same conditions although both were equally hydrophobic immediately after preparation. This would indicate that air which is sorbed during surfation continued to affect the unstabilized 58-1.

This example illustrates that differences are somewhat more pronounced with a maximum concentration of unsaturated acid.

| No. | 58-1 | 58-2 |
|---|---|---|
| % EM-315 | 1.00 | 1.00 |
| % VP | 0 | 0.05 |
| % DBPC | 0 | 0.02 |
| Mix time, minutes | 2:00 | 1:20 |
| Mix temp., 'F. | 130 | 132 |
| % EM-315 reacted, bagged; | | |
| 1 hour | 37 | 41 |
| 3 days | 49 | 60 |
| OA/LO, bagged 3 days | 13.4 | 10.6 |
| OA/LO, exposed | | |
| 4 days | 12.6 | 10.6 |
| 7 days | 13.2 | 10.6 |
| PF, bagged, 3 days | 0.723 | 0.768 |
| PF, exposed, 7 days | 0.726 | 0.768 |
| Density | 2.664 | 2.665 |

EXAMPLE 3

The calcite filler of example 2 was used. Commercially pure NF grade of sorbic acid; Sorbistat of Pfizer, was dissolved in DR-35 of example 1 at equal parts by weight (100% liquid agent on the acid) as was the DBPC. Surfation conditions were standard except that 59-2 followed 59-1 in a short time and the blender jar was not allowed to cool, so 59-2 had a much higher final temperature. The significantly different temperatures had no effect on the acid reacted after 1.5 hours and 3 days.

This example illustrates the use of a liquid agent to act as a solvent for the normally crystalline acid at surfation temperatures and eliminates the need for volatile solvents. The difference in OA/LO values indicates that the doubly unsaturated sorbic acid was unstable in the surfation process and that the air imbibed in processing significantly affected the 59-1 surfied filler whether bagged or exposed. The use of 0.04% DBPC with the very reactive acid produced complete stability for 59-2 and a significantly improved PF over the non-surfied filler (0.713 versus 0.740) whereas the unstabilized 59-1 was poorer.

The surfied fillers were not hydrophobic but no separation was noted and this is not a requirement for highly polar systems such as unsaturated polyester sols where the conjugated unsaturation of the sorbic acid will provide a high order of interaction.

| No. | 59-1 | 59-2 |
|---|---|---|
| % Sorbic acid | 0.40 | 0.40 |
| % DR-35 | 0.40 | 0.40 |
| % DBPC | 0 | 0.04 |
| Mix time, minutes | 4:30 | 4:30 |
| Mix temp., 'F. | 132 | 156 |
| % Sorbic reacted, bagged; | | |
| 1.5 hours | 37 | 37 |
| 3 days | 50 | 50 |
| OA/LO, bagged; | | |
| 1 day | 14.0 | 12.2 |
| 3 days | 15.0 | 12.2 |
| PF, bagged | | |
| 1 day | 0.713 | 0.740 |
| PF, exposed | | |
| 7 days | 0.696 | 0.740 |
| density | 2.67 | 2.67 |

EXAMPLE 4

The filler was the same as that of example 2. Itaconic acid of Pfizer was used as a 20% solution in denatured alcohol since it has a crystalline melting point of 167-168' C. It is a diacid with one double bond and probably occupies a surface area only slightly greater than the straight chain acids. Based on the above calculations, about 0.46% would be required for full saturation of the reactive surface of the filler. Its density was 1.49 and molecular weight 130. One-half of the calculated concentration was used; 0.23% to illustrate the effectiveness of the present teachings.

Mixing conditions were standard and the alcohol evaporated without affecting product properties.

It may be seen that the OA/LO for the unstabilized 63-2 was lower than the stabilized 63-3 after being bagged for 7 days, but that even a short exposure to air of 4 days at ambient causes a considerable increase. All of the OA/LO were within the range of precision for 63-3 indicating complete stability with only 0.01% DBPC, and significant improvement over the non-surfied filler.

EXAMPLE 4

| No. | 63-2 | 63-3 |
|---|---|---|
| % Itaconic acid | 0.23 | 0.23 |
| % DBPC | 0 | 0.01 |
| Mix time, minutes | 2:30 | 2:30 |
| Mix temp., 'F. | 120 | 140 |
| % itaconic reacted, | | |
| bagged, 1 day | 66 | 72 |
| OA/LO, bagged, 7 days | 12.6 | 13.2 |
| OA/LO, exposed, | | |
| 4 days | 13.8 | 13.0 |
| 7 days | 14.0 | 13.0 |
| PF, bagged, 7 days | 0.732 | 0.732 |
| PF, exposed, 7 days | 0.711 | 0.726 |
| density | 2.705 | 2.705 |

EXAMPLE 5

The filler was the same as example 2. The crotonic acid was that of Eastman Industrial Chemicals having the typical properties 86 molecular weight, 99.4% purity, 0.953 density and a melting point of 70-73' C. It was prepared as a 30% solution in denatured alcohol in which the antioxidant and synergist were soluble. It consisted almost entirely of the stable trans isomer. Ionol is an antioxidant of Shell Chemical and identified as 2, 6-di-tertiary-butyl-4-methyl-phenol, having properties similar to DBPC. The synergist was Evans Chemetics di-tridecyl-thiodipropionate (DTTP), a liquid of density 0.93 and soluble in the surfier solution. Tri-cresyl-phosphate (TCP) was a liquid agent of Stauffer Chemical, Phosflex 179C, a commercially pure grade having a density of 1.165 and a boiling point of 260-275' C. at 10 mm. TCP is a good solvent, wetting agent and plasticizer.

The data indicates that the unstabilized 64-1 increased in OA/LO whether bagged or exposed whereas the stabilized surfied fillers remained constant. The very short mixing times would have been expected to cause less degradation of 64-1, but, again, it appears to have degraded during surfation. The TCP did not noticeably alter the properties, but with the addition of 0.1% it might have caused an increase in OA/LO if there had not been cooperation with the crotonic acid. Also evident is the effectiveness of the combined antioxidant at only 0.01%. None of the surfied fillers were hydrophobic.

| No. | 64-1 | 64-2 | 64-3 |
|---|---|---|---|
| % Crotonic | 0.309 | 0.309 | 0.309 |
| % Ionol | 0 | 0.005 | 0.005 |
| % DTTP | 0 | 0.005 | 0.005 |
| % TCP | 0 | 0 | 0.10 |
| Mix time, minutes | 1:30 | 1:30 | 1:30 |
| Mix temp., °F. | 120 | 134 | 140 |
| OA/LO, bagged 7 days | 12.8 | 12.2 | 12.2 |
| OA/LO, exposed, 7 days | 12.8 | 12.0 | 12.2 |

This type of surfied filler is especially suitable for use in semi-rigid, to rigid composites where the shorter-chain crotonic acid will cross-link with unsaturated polymers or help to stabilize vinyl polymers.

EXAMPLE 6

The filler was the same as example 2. Soya fatty acid, Emery 610 of Emery Industries, was used and had the following properties; iodine value of 125 minimum, acid value of 195-205, a density of about 0.9, a saponification value of 196-207 and an acid analysis of 5% linolenic, 48% linoleic, 25.5% oleic, 1% palmitoleic, 4% stearic, 16% palmitic, 0.5% myristic and a trace of lauric. Butyl Zimate is a product of R. T. Vanderbilt consisting of powered zinc dibutyl dithiocarbamate. Triton CF-10 is a product of Rohm and Haas Co., an octy phenol-ethylene oxide addition product commonly used as a dispersant, wettant and emulsifier and a good solvent for many polymers. Having hydroxyls and ether linkages, it is especially useful in polar polymers which are hydrophilic, such as polyamides, where it acts as an interfacial plasticizer and stabilizer.

To emphasize the effectiveness of the CF-10, 64-5 was made with it and no antioxidant to compare with 64-4, the filler surfied with EM-610 only. It may be seen that CF-10 exerted a temporary stabilizing effect on OA/MO after being bagged 3 days, but lost the advantage after 7 days. It is noted that 64-5, on exposure to air, regained some of the advantage in OA/MO versus 64-4. With butyl zimate, 64-6 was stable since all values for OA/MO were within the precision of the test, and very low values were obtained. This also indicates that liquid agents having multiple effects are very suitable for present purposes.

Mineral oil DR-35 was used in the OA/MO test to show that even with non-polar systems the benefits of the unsaturated acid predominate.

| No. | 64-4 | 64-5 | 64-6 |
|---|---|---|---|
| % EM-610 | 1.00 | 1.00 | 1.00 |
| % Butyl Zimate | 0 | 0 | 0.02 |
| % CF-10 | 0 | 0.10 | 0.10 |
| Mix time, minutes | 1:45 | 1:30 | 1:15 |
| Mix temp., °F. | 120 | 130 | 110 |
| OA/MO, bagged: | | | |
| 3 days | 11.0 | 10.4 | 10.2 |
| 7 days | 11.6 | 11.8 | 10.0 |
| OA/MO, exposed | | | |
| 3 days | 11.6 | 11.0 | 9.8 |
| 7 days | 11.4 | 11.0 | 9.8 |
| PF, bagged, 3 days | 0.761 | 0.771 | 0.775 |
| PF, exposed, 7 days | 0.754 | 0.761 | 0.782 |
| density | 2.66 | 2.65 | 2.65 |
| % HP, initial | | | |
| 6 days on water | 100 | 95+ | 95+ |

EXAMPLE 7

The criticality of antioxidant and the reactivity of wollastonite are demonstrated. Wollastonite P-4 of Nyco, a natural calcium metasilicate filler, had a surface area of about 1.5 m²/g, an average particle size of 5.5 μm, 100% finer than 44 μm, a density of 2.9 and an OA/LO of 17.6. The EM-315 and DBPC were those of example 1. DLTP is a synergist, di-lauryl-thiodipropionate of Evans Chemetics, density 0.98.

Although the mixing time was limited to only one minute, both surfied fillers were noticeably dusty compared with the filler before surfation. The lath-like shape and brittleness of the particles appears to have reduced the particle size and increased the surface area. This is also indicated by the partial wetting on water in the HP test.

The mixed antioxidant concentration of only 0.0029% had a definite stabilizing effect on the OA/LO, bagged, 3 days for 72-2 whereas 72-1 had a value approaching the non-surfied filler. After 3 days in air, both samples had the same values. This had been noticed in other cases where OA declined due to polymerization of the long-chain acids as in drying oils. Intermediate steps in auto-oxidation consist of oxygenated and hydroxylated double bonds which are highly polar and tend to bond more liquid in the OA test. When the gels, water is released and the film becomes less polar. Such was the case with 72-1 at 3 days exposure to air. Since 72-2 increased in OA/LO after three days exposure, the antioxidant had retarded oxidation and it was therefore partially oxidized and more polar. The antioxidant concentration was too low, but demonstrates that 0.005% at the low original surface area would definitely have stabilized the surfied filler.

Wollastonite was found to have adequate reactivity for present purposes.

EXAMPLE 7

| No. | 72-1 | 72-2 |
|---|---|---|
| % EM-315 | 0.605 | 0.58 |
| % DBPC | 0 | 0.00145 |
| % DLTP | 0 | 0.00145 |
| Mix time, minutes | 1:00 | 1:00 |
| Mix temp., °F. | 140 | 150 |
| OA/LO, bagged, 3 days | 17.2 | 15.8 |
| OA/LO, exposed, 3 days | 16.6 | 16.6 |
| % HP, initial | 50 | 50 |

EXAMPLE 8

A finely water-ground calcite, Supermite of Thompson-Weinman Co., was used and had a surface area of 7.2 m2/g, an average particle size of 1 μm, an OA/LO of 14.8, an OA/MO of 26.0 and a density of 2.71. The acid was tall oil heads from distillation of crude tall oil, Emtall 743 (EM-743) of Emery Industries, having about 70% 16 to 18 carbon fatty acids, 2% maximum rosin acids, about 28% decarboxylated residues of the fatty acids, an acid value of about 140, an iodine value of about 130 and a density of about 0.9. This is then a product comprising mixed saturated and unsaturated acids and liquid agent. BLE-25, a product of Uniroyal, is a diphenyl amine-acetone condensation product generally used as an antioxidant in thermoset rubber.

OA/MO data for the bagged, 2 days, samples indicate that EM-743 had polymerized as described above. In order to make a comparison with prior data, and to assess the effect of higher temperature exposure versus ambient exposure, 10 g of each surfied filler were placed in aluminum dishes and spread to the same thickness of about 1 cm. These were then placed in a preheated convection oven at 300° F. for 5 minutes. At the end of that time the dishes were sealed with aluminum foil and allowed to cool for two hours before testing at room temperature. This exposure would approximate dry-blending the surfied filler with polyethylene pellets, for example, and subsequently feeding the mixture to a heated extruder for fabrication. The OA/MO data indicate that a significant change occurred between the bagged and exposed samples of 73-1 whereas 73-2 had values with the range of precision of the test. OA/LO values also were included to show that PF values in both polar and nonpolar media, whereas 73-1 did not. A very obvious effect of exposure was the color of the surfied fillers wherein the antioxidant prevented the gross color change from the initially white products. Both fillers were completely hydrophobic before and after exposure, and exhibited the same degree of acid reaction.

EXAMPLE 8

| No. | 73-1 | 73-2 |
|---|---|---|
| % EM-743 | 2.00 | 2.00 |
| % BLE-25 | 0 | 0.04 |
| Mix time, minutes | 1:40 | 1:40 |
| Mix temp., 'F. | 120 | 120 |
| % EM-743 reacted, 1 day | 60 | 62 |
| OA/MO, bagged, 2 days | 10.0 | 10.8 |
| OA/MO, exposed. | | |
| 5 minutes, 300' F. | 10.8 | 10.4 |
| OA/LO, exposed | | |
| 5 minutes, 300' F. | 11.2 | 10.8 |
| Color exposed | yellow | v. sl. yellow |
| PF/MO, bagged | 0.770 | 0.757 |
| PF/MO, exposed | 0.756 | 0.764 |
| PF/LO, exposed | 0.761 | 0.768 |
| Density | 2.61 | 2.61 |

EXAMPLE 9

This example utilizes a New York State "talc", International 325 Talc, which is a mixture of the mineral talc and substantial proportions of tremolite, anthophyllite, chrysotile, antigorite and usually calcite. The filler had a surface area of about 10 $m^2/g$, an average particle size of 4.4 $\mu m$, a density of 2.74 and an OA/MO of 27.4 equal to a PF of 0.538. Most of the minerals have an exposed magnesium hydroxide surface of about 50% of the surface area, the remaining being non-reactive silica. According to equivalency calculations based on reaction with calcite, 0.7% of the EM-610 should saturate the reactive surface. EM-610 and butyl zimate were those used in example 6.

As a platy type of filler it is commonly used in polypropylene to increase modulus and deflection temperature, and the reason for the OA/MO test for a non-polar medium. Again, the decline in OA/MO on exposure from 4 to 7 days for 73-3 parallels that of example 7. All OA/MO data for 73-4 were within precision limits and considerably less than 73-3. Although the filler had a high surface area, 0.021% butyl zimate provided effective stabilization. The minimum mixing time and temperature also provided adequate reaction to show that these mineral fillers conform with the present teachings.

| No. | 73-3 | 73-4 |
|---|---|---|
| % EM-610 | 0.70 | 0.70 |
| % butyl zimate | 0 | 0.021 |
| Mix time, minutes | 1:00 | 1:00 |
| Mix temp., 'F. | 115 | 125 |
| % EM-610 reacted, bagged | | |
| 3 days | 64 | 63 |
| OA/MO, bagged, 8 days | 23.0 | 22.2 |
| OA/MO, exposed | | |
| 4 days | 26.2 | 22.4 |
| 7 days | 23.6 | 22.6 |
| PF, bagged, 8 days | 0.590 | 0.598 |
| PF, exposed 4 days | 0.558 | 0.596 |
| density | 2.65 | 2.65 |

EXAMPLE 10

Albacar 5970 of Pfizer, a precipitated calcium carbonate having an average particle size of 0.6 $\mu m$, a surface area of about 8 $m^2/g$, a density of 2.71, and OA/MO of 76.4 and a PF/MO of 0.297 was used. It is typically used as an impact modifier in rigid vinyls at low concentrations. According to calculations given above, 2.6% by weight of EM-610 would be required to saturate the surface. EM-610 and butyl zimate were the same as example 6. Neodene 16-18 of Shell Chemical was used as the liquid agent and was a mixture of 16 to 18 carbon atom alpha olefins with a density of 0.786. Nos. 77-1 and 77-2 are direct comparisons with and without antioxidant, but for 77-3 EM-610 was reduced 20% and 100% of its weight of Neodene 16-18 was used.

Although the data for OA/MO deviate to some extent due to the difficulty in wetting and packing the extremely fine filler, the differences between stabilized and unstabilized EM-610 surfied fillers are considerable. Neodene 16-18 in 77-2 allowed the use of a lower concentration of EM-610 at 100% on the weight of EM-610 with equal or slightly improved properties over 77-2 without, but entirely changed the character of the filler. No. 77-1 was very highly charged with static electricity whether bagged or exposed. No. 77-2 had almost no static charge and was fine powder. No. 77-3 was completely without static charge and was a more dense, non-dusting power. All products were completely hydrophobic whereas the base filler was completely hydrophilic.

Improvement in color for the stabilized fillers 77-2 and -3 versus 77-1 and PF improvement over the base filler of 65% for 77-2 and 68% for 77-3 indicates that much higher filler concentrations can be used to provide equal impact resistance in composites.

| No. | 77-1 | 77-2 | 77-3 |
|---|---|---|---|
| % EM-610 | 2.60 | 2.60 | 2.08 |
| % Butyl zimate | 0 | 0.104 | 0.083 |
| % Neodene 16-18 | 0 | 0 | 2.08 |
| Mix time, minutes | 2 | 2 | 2 |
| Mix temp., 'F. | 110 | 120 | 120 |
| % EM-610 reacted, | | | |
| bagged 4 days | 45 | 47 | 51 |
| OA/MO, bagged | | | |
| 3 days | 44.8 | 33.8 | 29.6 |
| 7 days | 52.4 | 35.4 | 35.4 |
| OA/MO, exposed | | | |
| 7 days | 47.2 | 33.6 | 31.6 |

| No. | 77-1 | 77-2 | 77-3 |
|---|---|---|---|
| PF, bagged 7 days | 0.393 | 0.490 | 0.499 |
| PF, exposed 7 days | 0.418 | 0.503 | 0.527 |
| Color, bagged 7 days | sl. yellow | white | white |
| density | 2.58 | 2.58 | 2.486 |

EXAMPLE 11

A dry-ground calcite, Vicron 15-15 of Pfizer, was used and had an average particle size of 3 μm, 100% finer than 15 μm, a surface area of 3.8 m²/g, 12.6 OA/LO, and a density of 2.71. Maleic acid (MA) was prepared from the commercial maleic anhydride of Reichhold Chemicals by hydrolysis, finely ground and made as a 40% solution in denatured alcohol for application to the filler. The density of MA is 1.59. Ionol was the same as in example 5. MA was inadvertently used at a concentration of 0.40% rather than 0.52% according to prior calculations to compensate for 3.0 versus 3.8 m²/g surface area.

These products were considerably different from prior examples. After about 1 minute mixing time, the fillers became extremely fine, filling the jar with a "smoke" of fine particles, making it difficult to remove the alcohol. When the Vicron 15-15 was treated by mixing in exactly the same manner, the OA/LO became 13.2, a significant increase over the 12.6 before treatment, but the extremely fine "smoke" was not produced. It would appear that the rapid and virtually complete reaction of the dibasic acid caused splitting or complete repulsion of the finer particles causing, in turn, a much higher OA/LO as the data reveals. Nonetheless, the differences in stability was significant with the Ionol antioxidant. It may be seen that the oxidation of 77-4 proceeded in any orderly fashion compared with the long-chain unsaturated acids of the above examples, although the air imbibed with surfation still had the effect of causing instability in the bagged sample. All of the OA/LO values for 77-5 were within the range of precision of the test and a 1% difference in PF is also considered significant. Neither the base filler or the surfied fillers were hydrophobic. Surfied fillers of this type would be generally suitable for rigid, cross-linked compositions.

| No. | 77-4 | 77-5 |
|---|---|---|
| % MA | 0.40 | 0.40 |
| % Ionol | 0 | 0.02 |
| Mix time, minutes | 2:15 | 2:15 |
| Mix temp., °F. | 125 | 130 |
| % MA reacted, 1 hour | | |
| soluble | 93 | 93 |
| whole product | 85 | 85 |
| OA/LO, bagged | | |
| one day | 14.8 | 14.8 |
| 7 days | 15.5 | 15.0 |
| OA/LO, exposed | | |
| 4 days | 15.3 | 15.1 |
| 7 days | 15.7 | 15.0 |
| PF, bagged, 7 days | 0.689 | 0.697 |
| PF, exposed 7 days | 0.687 | 0.697 |
| Density | 2.702 | 2.700 |

EXAMPLE 12

The filler was a coarse dry-ground Ohio limestone containing various impurities and having a gray color, a density of 2.71, 99% finer than 20 mesh (840 μm) an average particle size of 44 μm, an OA/MO of 12.0 and PF of 0.727, when heated and mixed in the same manner as the surfied samples so that any alteration of this property would be compensated. EM-743 was the same as that of example 8 and butyl zimate that of example 6.

The concentration of EM-743 was established on the basis of that required to obtain complete hydrophobocity for this very low surface area filler. The OA/MO data indicated that after aging in sealed bags 71-6 increased on exposure for 8 days whereas 78-2 with butyl zimate did not. This type of filler is suitable for polyethylene composites as carpet backing or with asphalt in roofing shingles. Accordingly, a similar non-polar vehicle, DR-35, previously described, was used for OA/MO. The freshly prepared fillers were carefully dispersed with high-shear mixing at 54% by weight of filler in DR-15 and all were equilibrated at the same ambient temperature free of entrained air. Viscosity testing was performed according to ASTM method D-88, Saybolt universal viscosity. The DR-15, a mineral oil of Pennreco, had a viscosity of 29.1 seconds, the mixed base filler was 200 seconds and 71-6 was 52.4 seconds. At 67% by weight of 71-6 the viscosity was 131.1 seconds indicating that surfation exerts a pronounced influence on viscosity and filler concentration and that reliable stability of the surfied filler in use is most desirable.

In the OA/MO test 71-6 was found to be grainy after exposure and somewhat difficult to disperse whereas 78-2 was not. This effect of oxidation was evident even at the low 0.36% EM-743, indicating that in poorly dispersing media, such as asphalt and polyethylene, any instability will cause dispersion problems.

EXAMPLE 12

| No. | 71-6 | 78-2 |
|---|---|---|
| % EM-743 | 0.36 | 0.36 |
| % butyl zimate | 0 | 0.1 |
| Mix time, seconds | 45 | 45 |
| Mix temp., °F. | 140 | 148 |
| % EM-743 reacted | | |
| one day | 21 | -- |
| OA/MO, bagged, | | |
| 11 days to 10 weeks | 7.5 | 7.5 |
| OA/MO, exposed | | |
| 8 days | 8.0 | 7.4 |
| PF, bagged | 0.813 | 0.813 |
| PF, exposed | 0.803 | 0.815 |
| density | 2.69 | 2.69 |

EXAMPLE 13

This example used Vicron 15-15 of example 11 and was devised to show effect of mole ratio on surfied filler stability and other variations of the present invention.

Butyl zimate and EM-610 were those used in example 6. Emery 658 (EM-658) of Emery Industries consisted of 56% caprylic, 40% capric, 3% caproic and 1% lauric acids with a maximum iodine value of 0.3, an acid value of 359 to 366, a saponification value of 361-368, and a density of 0.905.

The proportions of saturated and unsaturated acids were calculated to adjust their mole ratios to those indicated in the table. Although Vicron 15-15 is reported to have a surface area of 3.8 m²/g, the acids were based on the equivalence of 1% 18 carbon acid to determine if hydrophobicity could be maintained at both 80% reaction of the available sites; 3.0/3.8 m²/g. The extra surface would then allow further modification with liquid agents as applicable to a variety of systems. This variation also illustrates the reduction of the weight of acid applied to reduce product cost as well as to control the proportion of unsaturated acids.

Iodine values are included for reference only since it is obvious that even a small proportion of lower molecular weight unsaturated acids would raise these values considerably.

OA/LO data indicate that the bagged samples reached minimums in 7 days but without butyl zimate 80-1 and -3 were unstable after 7 days of exposure. The use of only 0.01% butyl zimate with 804 resulted in a lesser degree of stability to reinforce the finding that the antioxidant is effective according to the surface area of the filler and that at a low mole ratio of 4 to 1 saturated to unsaturated acids the effect of the unsaturate predominates. The minimum requirement for this filler is then 0.02% butyl zimate, to assure stability. The susceptibility to oxidation at this minimum mole ratio also indicates that unsaturated sites may be controlled to provide the degree of reactivity desired for a particular system.

Initially, all of the surfied fillers were completely hydrophobic.

EXAMPLE 13

| No. | 80-1 | 80-2 | 80-3 | 80-4 |
|---|---|---|---|---|
| % EM-610 | 0.50 | 0.50 | 0.25 | 0.25 |
| % EM-658 | 0.27 | 0.27 | 0.41 | 0.41 |
| % Butyl zimate | 0 | 0.02 | 0 | 0.01 |
| Iodine value of mixed acid | 81 | 81 | 47 | 47 |
| Mole ratio, sat. to unsat. acid | 1.49 | 1.49 | 3.98 | 3.98 |
| Mix time, minutes | 1 | 1 | 1 | 1 |
| Mix temp., °F. | 132 | 146 | 146 | 155 |
| OA/LO, bagged, 1 day | 12.4 | 12.2 | 12.6 | 12.4 |
| 7 days | 12.0 | 11.4 | 12.2 | 11.7 |
| OA/LO, exposed, 7 days | 13.2 | 11.4 | 13.0 | 12.4 |
| % acid reacted, bagged | | | | |
| 1 day | 27 | 32 | 26 | 27 |
| 7 days | 45 | 45 | — | — |
| PF, bagged 7 days | 0.744 | 0.753 | 0.741 | 0.749 |
| PF, exposed 7 days | 0.725 | 0.753 | 0.728 | 0.737 |
| Density | 2.67 | 2.67 | 2.67 | 2.67 |

EXAMPLE 14

This example illustrates a practical use of the surfied fillers of the present invention.

A sample of Laminar similar to that of example 1 was used and had the following slightly different properties: 100% finer than 23 μm and an average particle size of 3.7 μm. Filler 15-4 was based on the same Laminar surfied with 1.13% of EM-135 and 0.02% DBPC of Example 1 and was prepared in the same manner. Comparative filler and compound properties in a representative chloroprene (Neoprene) rubber compound for evaluating fillers are given in the table. The compounds were prepared and evaluated at an independent laboratory using procedures standard to the rubber industry.

These data illustrate the exceptional effects of unsaturated surfiers on the properties of a filler typically used in rubber compounding. The Laminar control compound had acceptable properties under optimum curing conditions. Surfied filler 15-4 exerted a pronounced improvement on modulus (+22%), tensile strength (+32%), elongation (+13%) and tear strength (+25%) with the same shrinkage and hardness. No deleterious changes in the state or rate of cure of the compound were found or special accommodations made for the surfied filler.

Although the parent filler had greatly different OA/LO and OA/MO values, surfied filler 15-4 had much lower values which calculate to almost the same PF values and thus exemplify its uniform properties in both polar and non-polar systems.

This example typifies the effectiveness of a polymer-reactive unsaturated acid surfied filler and would suggest to those practicing this art a multitude of applications for the teachings of the present invention.

EXAMPLE 14

| | parts by weight | |
|---|---|---|
| Neoprene | 100. | |
| Magnesium oxide | 4. | |
| Agerite Stalite S | 2. | |
| Stearic acid | 0.5 | |
| FEF Carbon black | 40. | |
| Filler (see below) | 80. | |
| Sundex 790 oil | 15. | |
| Zinc oxide | 7.5 | |
| Ethylene thiourea | 0.4 | |
| Filler | Laminar | 15-4 |
| Density | 2.71 | 2.65 |
| OA/LO | 17.2 | 12.8 |
| OA/MO | 28.2 | 12.2 |
| PF/LO | 0.666 | 0.733 |
| PF/MO | 0.534 | 0.730 |
| In above compound cured 20 min./320° F. | | |
| 200% modulus, psi | 925 | 1125 |
| Tensile strength, psi | 1575 | 2075 |
| % Elongation | 310 | 350 |
| Hardness, Durometer A | 77 | 77 |
| Shrinkage, in./in. | 0.0150 | 0.0150 |
| Tear strength, Die C, lb/in. | 151 | 188.5 |

I claim:

1. A stabilized surface modified filler consisting of:
   (a) an organic acid reactive filler selected from the group consisting of calcite, aragonite, amphiboles including tremolite, anthophyllite, and actinolite, brucite, antigorite, talc, chlorite, wollastonite, gibbsite, diaspore, boehmite and mixtures thereof having a size range of from 100 percent minus 10 mesh U.S. Standard sieves to about 0.07 micrometers equivalent spherical diameter;
   (b) an organic acid selected from the group consisting of organic acids having 3 to 24 carbon atoms and zero to 5 double bonds including cyclic rosin acids, isostearic, ricinoleic, licanic and diacids maleic and itaconic and mixtures thereof such that the molar ratio is at least one of unsaturated acid to 4 of saturated acid to entirely unsaturated acid, present from about 0.1 to 10 percent by weight of the filler;
   (c) an antioxidant present from about 0.005 to 0.1 percent based on the weight of the filler; and
   (d) a liquid agent present from 0 to about 100% based on weight of the organic acid, being liquid at about 15°–55° C. and having boiling points above about 200° C. at atmospheric pressure and substantially non-reactive with said organic acid below about 120° C.

2. The surface modified filler of claim 1 wherein said unsaturated acid is selected from the group consisting of acrylic, methacrylic crotonic, sorbic, maleic, itaconic and mixtures thereof.

3. The surface modified filler of claim 1 wherein said acid is selected from the group consisting of 6 to 18 carbon mono-basic acids, and mixtures thereof.

4. The surface modified filler of claim 1 wherein said acid is selected from the group consisting of mixtures of acids derived from triglycerides of animal and vegetable origin.

5. The surface modified filler of claim 1 wherein said antioxidant is selected from the group consisting of zinc-dibutyldithiocarbamate; 2, 6-di-tertiary-butyl-para-cresol; 2, 6-di-tertiary-butyl-4-methyl-phenol; 4-6-tertiary-butyl-metacresol; 2,2'-methylene-bis-(4-methyl-6-tertiary-butyl-phenol) and mixtures with up to 50 percent by weight of the antioxidant of an antioxidant synergist selected from the group consisting of dilauryl-thio-dipropionate, dimyristyl-thio-dipropionate, distearyl-thio-dipropionate, dicetyl-thio-dipropionate, di-tridecyl-thio-dipropionate, poly-thio-dipropionate, organo-phosphites and mixtures.

6. The stabilized surface modified filler as defined in claim 1 wherein said antioxidant is selected from the group consisting of ketone-amine condensates, alkylated phenols, alkylated bis-phenols, alkylated cresols and mixtures thereof.

7. The stabilized surface modified filler as defined in claim 1 wherein said antioxidant is selected from the group consisting of ketone-amine condensates, alkylated phenols, alkylated bis-phenols, alkylated cresols and mixtures with up to 50 percent by weight of the antioxidant of a synergist selected from the group consisting of thiodipropionate esters, alkyl, aryl and alkaryl phosphites and mixtures thereof.

8. The stabilized surface modified filler as defined in claim 1 wherein said liquid agent is selected from the group consisting of aliphatic, aromatic and cyclic hydrocarbons, chlorinated hydrocarbons, petrolatums, and mixtures thereof.

9. The stabilized surface modified filler as defined in claim 1 wherein said liquid agent is selected from the group consisting of N-vinyl pyrrolidone, unsaturated acid esters, mixed unsaturated and saturated acid esters, allylic aromatic and aliphatic acid esters, allyl phosphates, unsaturated and saturated low molecular weight polymers, 10 to 18 carbon alpha olefins, pine oil and mixtures thereof.

10. The stabilized surface modified filler as defined in claim 1 wherein said liquid agent is selected from the group consisting of mono-and-di-glycol ether and saturated acid esters; sulfolane; ethylene oxide derivatives of phenol, alkyl phenols, polyols, propylene oxide and organic acids; 2-pyrrolidone; N-substituted 2-pyrrolidone derivatives; glycols; saturated acid esters; unsaturated polyols; phosphate esters, acetylenic glycols; ketones and mixtures thereof.

11. The stabilized surface modified filler as defined in claim 1 wherein said organic acid is at least partially reacted with said organic acid reactive filler.

* * * * *